United States Patent [19]

Doerer et al.

[11] Patent Number: 4,474,846

[45] Date of Patent: Oct. 2, 1984

[54] MOLDABLE FIBROUS MAT AND PRODUCT MOLDED THEREFROM

[75] Inventors: Richard P. Doerer, Grosse Pointe, Mich.; Joseph T. Karpik, Floodwood, Minn.

[73] Assignee: Van Dresser Corporation, Troy, Mich.

[21] Appl. No.: 453,765

[22] Filed: Dec. 27, 1982

Related U.S. Application Data

[63] Continuation-in-part of Ser. No. 251,239, Apr. 6, 1981, abandoned, and Ser. No. 352,501, Mar. 2, 1982, Pat. No. 4,418,031.

[51] Int. Cl.³ .............................................. D04H 1/58
[52] U.S. Cl. .................................. 428/284; 428/280; 428/286; 428/288; 428/326
[58] Field of Search ............... 264/122, 241, 257, 259; 428/288, 326, 280, 284, 286

[56] References Cited

U.S. PATENT DOCUMENTS 2,483,405 10/1949 Francis ................................ 428/296
4,265,954 5/1981 Romanek ............................ 428/195

FOREIGN PATENT DOCUMENTS 1171941 11/1964 United Kingdom .
1088991 10/1967 United Kingdom .
1118163 6/1968 United Kingdom .
1185623 3/1970 United Kingdom .
1581486 12/1980 United Kingdom .
2054681 2/1981 United Kingdom .

Primary Examiner—James J. Bell
Attorney, Agent, or Firm—Barnes, Kisselle, Raisch, Choate, Whittemore & Hulbert

[57] ABSTRACT

A moldable fibrous mat from which a permanently rigid product of predetermined shape can be molded by the application of heat and/or pressure. The mat consists essentially of base fibers and carrier fibers and a thermosetting ingredient, with the base fibers having a substantially higher softening temperature, if any, than the carrier fibers. The fibers intertwine to resist separation. The carrier fibers are bonded to the base fibers and to each other to form connections, the thermoset remaining dormant in the making of the mat. There is also disclosed a method by which the moldable fibrous mat is made and product made from the mat, which product may be of uniform density or have areas of differing density.

13 Claims, 4 Drawing Figures

MOLDABLE FIBROUS MAT AND PRODUCT MOLDED THEREFROM

This application is a continuation-in-part of our prior co-pending applications Ser. No. 251,239 filed Apr. 6, 1981, now abandoned, and Ser. No. 352,501 filed Mar. 2, 1982, now U.S. Pat. No. 4,418,031.

The invention relates generally to fiber technology. More particularly, the invention refers to a flexible, handleable fibrous mat which is designed to be molded into a permanently rigid, self-supporting shaped end product by the application of heat and pressure, the process by which said mat is produced, and also the process by which the mat is converted to an end product. The mat consists essentially of base fibers and carrier fibers, plus a thermosetting ingredient which is uncured but is adapted to cure at a later time when the mat is subjected to heat and pressure to make the end product. The fibers intertwine to resist separation. The carrier fibers are bonded to the base fibers and to each other to form connections. The mat can be molded into a wide variety of end product shapes. The product may be of uniform density or it may have areas of differing density.

PRIOR ART

Non-woven fibrous material made by a dry process is well known in the prior art. British Pat. No. 1,088,991 discloses a method of making a web composed of fine, paper-making pulp and synthetic fibers for use as disposable diapers and other absorptive products. The above invention is designed to produce a soft, flexible end product in one step. The method does not include addition of a thermoset ingredient, and therefore, the product made by said method cannot be molded into a permanently rigid form. For purposes of this application, a product is permanently rigid if it is not subject to deformation at higher temperature.

British Pat. No. 1,171,941 discloses a non-woven fabric of cotton and polypropylene fibers having wet strength and useful as a material for wiping cloths and for surgical purposes. The above invention is a soft, flexible end product produced in one step, containing no thermoset ingredient, and, therefore, not moldable into a permanently rigid form.

British Pat. No. 1,581,486 discloses a non-woven fabric for use as an absorbent wiping material and composed of polymeric microfibers and wood pulp fibers held together in a mechanical entanglement. The above invention is also designed to produce a soft, flexible end product in one step, containing no thermoset ingredient, and, therefore, not moldable into a permanently rigid form.

British Pat. No. 1,185,623 discloses a fibrous structure in the form of a fleece that may be used as a blanket or carpet underlay and which is made of polyamide and/or polyester fibers constituting first fibers, together with second fibers of polyamide having a lower melting point than the first fibers. The second fibers when heated lose their fibrous identity and coat the first fibers to weld them together. The above product contains no thermoset, and is, therefore, not capable of being molded into a permanently rigid form.

British Pat. No. 1,118,163 discloses non-woven fabric for use in making articles of apparel formed of filaments or fibers bonded together by the adhesive characteristics of one of the fiber components. The above product contains no thermoset, and is, therefore, not capable of being molded into a permanently rigid form.

U.S. Pat. No. 2,483,405 discloses a non-woven fibrous product comprising a blend of non-adhesive fibers admixed with adhesive synthetic fibers. The above invention cites the use of thermoplastic resins or thermosetting resins in the thermoplastic state in creating fibers, through spraying, for use as a bonding means in making thread, non-woven batting, or various other fibrous products. The inventor states that "the products of the invention may at any time be embossed, calendered, moulded or otherwise shaped, in whole or in part, to deform the surface while the adhesive fibers are still tacky and then subsequently deactivated to set them with a desired form or surface condition to produce effects such as grain, lustre, smoothness or designs, by suitable means, used hot or cold, and with or without the aid of agents which soften, swell or plasticize the material acted upon." However, the inventor does not teach the combination of both a bonding means and an inactive thermoset with the non-adhesive fibers, nor does he teach a two-stage manufacture, the thermoset to be activated in a second stage under heat and pressure to mold a permanently rigid part. The invention also teaches only the blending of fibers, as opposed to fibers and powdered resins.

U.S. Pat. No. 4,265,954 discloses a non-woven fiber which is fused selectively in chosen areas while blocking fusion elsewhere. The above invention also contains no thermoset, and is not capable of being molded into a permanently rigid form.

All of the above inventions are refinements of the basic non-woven technology based on heat-sealing and/or mechanically entangling fibers for the purpose of obtaining a handleable web without weaving. However, none of the products to date have been capable of being stored, shipped, etc., and then subsequently molded into a permanently rigid, self-supporting, shaped end product by the application of heat and pressure. This invention, for the first time, fills the need for a highly moldable material made through a dry process.

BACKGROUND AND SUMMARY OF THE INVENTION

In accordance with the present invention, cellulose base fibers, wood for example, are intertwined with and bonded to carrier fibers, and blended with a thermosetting ingredient to create a moldable fibrous mat. The intertwining is done through use of special non-woven web machinery. The bonding is done through either heating of a thermoplastic bonding agent or activation of a chemical bonding agent. The mat is made in the first stage of a two-stage process of making a permanently rigid end product. The thermosetting ingredient, which remains uncured in the first stage, cures under the heat and pressure of the second stage in which the end product is completed.

Prior art in compressed wood fiber technology includes fiberboard, particle board and hardboard, terms applied to a variety of products made primarily from wood fibers, wood chips or shavings. These are not substantially formable. Extreme shapes, similar to those attainable through this invention, can be achieved by a so-called wet slurry process in which wood fibers are mixed with water and other chemicals and formed into a slurry which is applied over a pattern having desired form. While satisfactory products can be made by the wet slurry process, it is a relatively expensive process not only in terms of the amount of energy required but also because of its long manufacturing cycle time and the cost of cleaning the resulting effluent prior to dumping. This invention, however, relates to a dry process and product made therefrom.

It has also been known to form wood fiber based products by dry processing, but these previously known dry processes are capable of producing products having only relatively flat simple shapes and require a minimum of two steps to mold, as opposed to one for this invention.

It is a primary object of this invention to provide a unique dry process of forming a flexible mat consisting essentially of base and carrier fibers, the base fiber being a cellulose fiber, and the carrier fiber being a linking fiber adapted to intertwine or interlock with the base fibers, plus a stage 1 bonding means and a thermoset resin. Suitable base fibers are made of materials such, for example, as wood, jute, sisal, cotton, coconut, kapok, paper, and other cellulose fibers. Products having far more severe draft angles, deeper cavities, and more complex curves can be made from the material produced by this new dry process than could possibly be made by previously known dry processes. Material made by the method of this invention can be molded in one step relatively fast and inexpensively into a variety of items such, for example, as decorative trim panels, automotive headliners, door panels, instrument panels, center trim pillars, package trays, consoles, furniture, luggage, building materials, packaging and the like. Such a product may have areas of differing density to provide portions that are soft to the touch or to provide visual embossing, and to provide both thermal and acoustical insulation. The ability to mold a self-supporting product with areas of low density eliminates the need for separate foam pads to be attached, thus offering significant economies.

A further object is to provide relatively flat, flexible, moldable fiber mat in continuous sheet or in sections which can be handled without damage either manually or by automation, and from which end products can be molded; also to provide a method of making the mat into a final product and the end product itself.

In accordance with a specific embodiment of the invention, the mat may comprise a mixture of wood fibers, thermoplastic carrier fibers that mechanically intertwine with the wood fibers and are also bonded or adhered to them to form interlocking connections which resist separation, and a thermoset resin. The mat fibers are adhered together by heating the mat to a temperature and for a period of time such that the thermoplastic carrier fibers soften and become sufficiently tacky to heat-seal to the wood fibers and to each other, but still substantially retain their essentially fibrous form. The carrier fibers add substantial tensile strength to the mat so that even when products molded therefrom have complicated or difficult shapes and include sharp bends and cut-outs, the body of the mat will, nevertheless, hold together without ripping or tearing when the mold parts close. The thermoset resin will cure and set during a subsequent molding operation, imparting permanent shape, thickness and density to the product. Other materials may be added to the formulation of the mat depending upon the characteristics desired in the finished product.

These and other objects and features of the invention will become more apparent as the following description proceeds, especially when considered with the accompanying drawings.

DETAILED DESCRIPTION

Referring now more particularly to the drawings, the numeral 10 generally designates a permanently rigid end product, and 12 generally designates a section of moldable fibrous mat from which the product is made.

Figure 4:
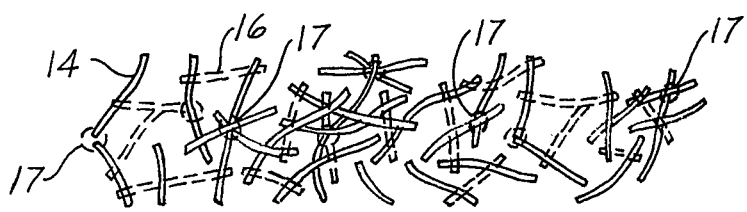
FIG. 4 is an enlarged fragmentary diagrammatic view showing the relationship between fibers in the moldable mat.

The moldable mat section 12 is formed of a multiplicity of fibers, including a mixture of base fibers 14, carrier fibers 16, bonding means and a thermoset 18 initially mixed together in a blender 40. In FIG. 4, the base fibers 14 are shown in solid lines and the carrier fibers in dotted lines as a simple means of distinguishing between the two. The base fibers 14 are cellulosic, such as wood, paper, coconut, cotton, jute, sisal or kapok. Preferably the base fibers are of wood, virgin or reclaimed, and are obtained from any suitable tree, such for example, as the aspen. The carrier fibers may be made of thermoplastic material selected from the vinyl family, the polyester family, the polyolefin family, the polyamide family, and any physical or chemical combination of those families. Examples of polyolefins are polyethylene and polypropylene. An example of a polyamide is nylon. Examples of vinyls are Saran, Vinyon and polyvinyl chloride (PVC). Saran is a polymer composed of at least 80% by weight of vinylidene chloride. Under the Textile Fiber Products Identification Act, any fiber containing 85% or more vinyl chloride may be labeled "Vinyon" and this includes 100% PVC fiber. Preferably the carrier fibers are thermoplastic in nature and excellent results have been achieved with polyolefins. The carrier fibers are intertwined or interlinked with the base fibers. The carrier fibers add tensile strength to the mat, and resist separation of the base fibers from the mat, while maintaining flexibility, so that it will hold together without tearing or breaking during rough handling, packing, shipping, loading into the mold (either manually or automatically) and when the mold parts close on it to mold a product. The base fibers, the carrier fibers, the thermoset, and the bonding agent are substantially uniformly distributed throughout the body of the mat. The base fibers comprise the greater number and the greater weight of fibers in the mat.

In addition to being mechanically intertwined, the base and carrier fibers of the mat are also bonded or adhered to one another where indicated diagrammatically at 17 in FIG. 4. While a separate bonding agent may be employed, preferably the carrier fibers themselves serve this purpose. As stated, the carrier fibers are preferably thermoplastic. If so, during the manufacture of the mat it is heated sufficiently to soften the thermoplastic carrier fibers and render them tacky. Hence, the carrier fibers of the mat retain their fibrous nature, and are generally recognizable as such, but heat-seal to one another and to the base fibers to form connections when the carrier fibers cool.

The thermoset resin is not affected by the oven temperature but cures and sets in the molding of the finished product. The purpose of the thermosetting material is to enhance the strength of the product, the stiffness of the product when subjected to high ambient temperatures in ultimate use, and to reduce the brittleness of the product under very low ambient temperature. A suitable mix of materials might consist of 85% by weight wood fibers, 10% by weight polypropylene carrier fibers and 5% by weight of phenolic resin.

From the blender 40, the mix is passed through a former 44 which is a device for distributing the mix on a moving belt 46 in a desired width and thickness to provide a continuous web 48 of mat material. The web 48 of mat material is transported on the belt through a curing oven 50 at a temperature and speed such that the material of the web remains in the oven only long enough to soften the thermoplastic fibers and make them tacky, but not long enough or at a high enough temperature to cure the thermoset. Hence, the thermoplastic fibers remain generally recognizable as fibers but, being tacky, they heat-seal to the base fibers and to each other to form connections when the mat cools. The thermoplastic fibers may be any of those previously identified, but if made of polyethylene, the oven 50 may, for example be maintained at a temperature in the range of about 250° F. to about 370° F. and the web will remain in the oven about one to three minutes. The oven also serves to dry the mat, which initially contains the moisture naturally present in wood fiber. Temperature of the oven and web speed will, of course, vary depending upon the thermoplastic material employed, mat thickness, moisture content and mat density.

In addition to or in place of thermoplastic carrier fibers, thermoplastic resin may be added to the mix from which the mat is formed. The added resin would be dispersed throughout the body of the mat and have a softening point approximately the same as that of the thermoplastic carrier fibers, or at least such that it would soften in the oven, to serve as a bonding agent between the base and carrier fibers. The use of the added thermoplastic resin would supplement the bonding action of the thermoplastic carrier fibers, or the carrier fibers could be made of some other, perhaps less expensive, material without the capability of softening in the oven, in which event the bonding together of the fibers in the mat and in the finished product would be effected by the added thermoplastic material. An example of a less expensive material from which the carrier fibers might be made is a common textile fiber blend of about 35% cotton and about 65% polyester. A suitable mix with percentages by weight might consist of 85%-87% wood fibers, 5% polyethylene resin, 3-5% blended textile fiber as above, and 5% phenolic resin. The oven temperature employed to make a mat from this mix would be sufficient to soften the polyethylene but not sufficient to soften or otherwise affect the fibers or the phenolic resin.

Although the tackifying of the carrier fibers to cause them to form bonded connections with the base fibers has been described as being carried out by heating the mat in an oven, and excellent results may be achieved by this method, it should be understood that the carrier fibers can be activated or tackified by other means such, for example, as by a chemical activating agent or by radiation heating. Moisture may serve as a chemical activating agent. Thus, the mat may be passed through a water vapor chamber instead of the oven 50, so that the carrier fibers will soften and become tacky and seal or bond to the base fibers. Ammonia is another chemical activating agent that may be employed. Radiation heating of the carrier fibers to make them tacky may be effected, for example, by gamma rays, ultra-violet rays or an electron beam.

Figure 1:
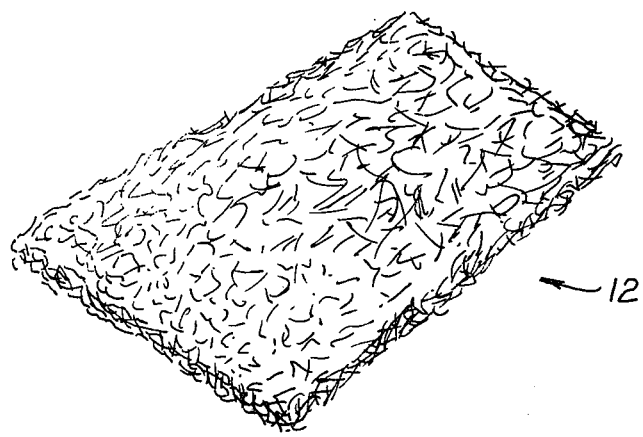
FIG. 1 is a perspective view of a section of fibrous mat made according to the present invention.
Figure 3:
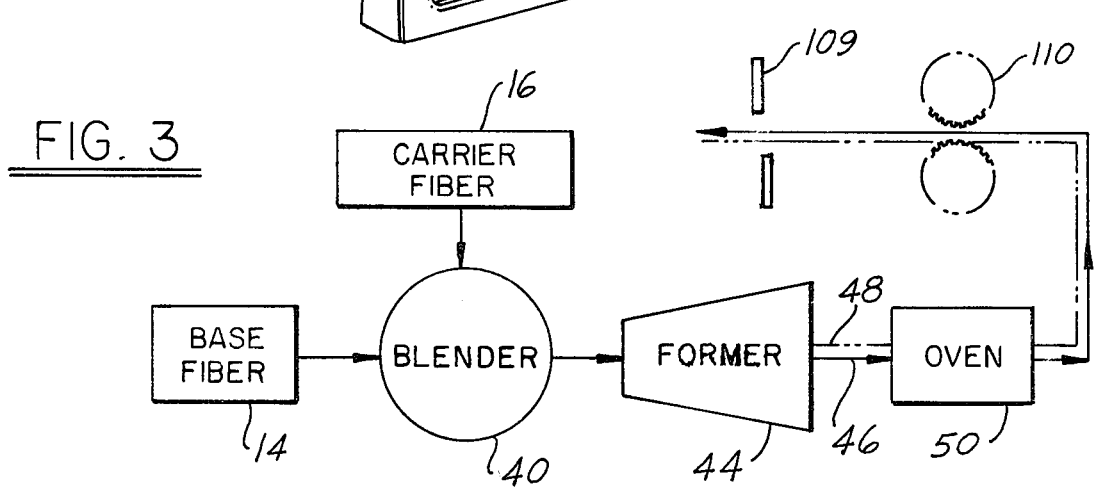
FIG. 3 is a flow diagram of the method by which the moldable mat is made.

The web 48 of mat material after it leaves the oven 50 advances through a crimping device which in this case is a pair of crimping rolls 110 between which the web passes. The rolls are cylinders arranged with their axes crosswise of the direction of web travel and have on their cylindrical surfaces spaced, parallel ribs which may, for example, extend either axially or circumferentially. The ribs impress a pattern of grooves or indentations in both surfaces of the web to further increase the flexibility of the web, permitting it to be handled and bent or flexed to an even greater degree without breaking. After leaving the crimping rolls 110, the web of material may be stored in roll form until ready for use or it may be immediately cut into individual mat sections of the type shown in FIG. 1 by a cutter 109 in FIG. 3.

The manufacture of the mat upon leaving the crimping rolls and being cut into sections is complete and constitutes the first stage in the manufacture of the permanently rigid end product. The mat is essentially dry, containing minimum moisture. The carrier fibers are intertwined and interlocked with the base fibers and resist separation of any fibers from the body of the mat. The fibers are adhered to or heat-sealed together by the bonding ingredient. The thermosetting ingredient is dormant. Mat sections shown in FIG. 1 cut from the web 48 of mat material after it leaves the crimping rolls 110 consist of a coherent mass which can be stacked, banded together in packs, compressed, picked up, molded into a product, and in general handled without coming apart or breaking or tearing.

Figure 2:
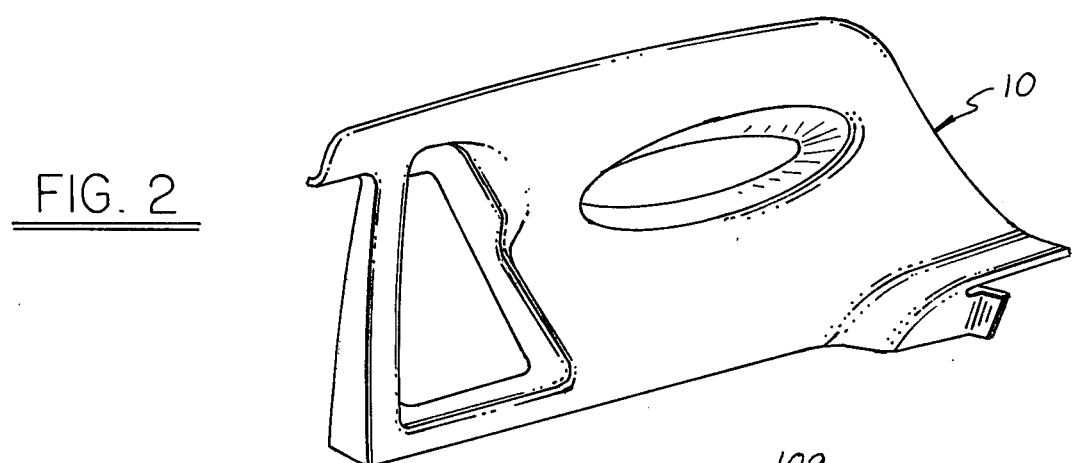
FIG. 2 is a perspective view of a typical permanently rigid end product that can be made from the section of moldable mat shown in FIG. 1.

The mold for making product 10 in FIG. 2 from the essentially dry mat in a second stage, which may be carried out at any time after manufacture of the mat in the first stage, has mold parts shaped to the desired configuration of the final product. The mold may be operated at a temperature of about 325° F. to 590° F., at a pressure of about 200 to 1000 psi. The mold cycle time may be as little as one minute or less. Actually, the temperature, pressure, and time cycle required will vary depending on the final product requirements. The thermoplastic ingredient, if any, softens and melts in the mold, flowing around the base fibers. The thermoset resin flows to surround the base fibers and cures and sets to form a finished product which is permanently rigid and self-supporting. The base fibers retain their fibrous form during molding, neither charring nor burning at the temperature of the mold, and impart tensile strength and stiffness to the product.

To illustrate the entire process, the following example is presented:

A formulation with percentages by weight is blended of 85% wood fibers, 5% blended non-thermoplastic textile fibers of 35% cotton and 65% polyester, 5% low melt point thermoplastic polyester resin, and 5% phenolic resin. The thermoplastic polyester softens and becomes tacky at 225° F. In order for the entire depth of the mat to become bonded, the surface temperature of the mat must reach 263° F. The phenolic resin requires a temperature of 325° F. or higher to cure, so remains essentially unaffected by the oven.

The web is carried through the oven, which is maintained at a temperature lower than the curing temperature of the phenolic resin but sufficient to achieve the required web surface temperature. Upon leaving the oven, the web is crimped, cut into sections, palletized, and stored for later molding. It is molded for 30 seconds at 375°–400° F. and 500 pounds per square inch pressure. The phenolic resin is cured by the end of the mold cycle, creating a permanently rigid, formed part.

Products can be molded of the material made by the dry process of this invention with configurations just as complex and with bends as sharp and angles of as small radii as by the wet slurry process; and yet this dry process, together with the subsequent molding of the product, is faster and less expensive than the wet slurry process. The wet slurry process requires substantially greater energy input than this dry process and subsequent molding operation in order to remove the great amount of moisture inherent in the wet slurry process. The wet slurry process requires special equipment to handle large amounts of water and to clean up the effluent. Such equipment is not needed in this dry process. The wet slurry process also requires three molds for the three separate stages needed to make a product, whereas with the material made by this dry process a product is formed from the mat in a single step in a single mold. Products can be formed from this dry process material with far more difficult and complex shapes than could be attained from dry process materials heretofore in use.

To summarize, the thermoplastic carrier fibers, or non-thermoplastic carrier fibers plus either thermoplastic resin or chemical bonding agent are mixed with the base fibers to intertwine with them to strengthen the mat and hold it intact during handling and when compressed between the mold parts to form a finished product. When the mat is heated in the oven, the carrier fibers or added thermoplastic resin become tacky and form a multiplicity of interlocking connections between fibers. Although the carrier fibers retain their identity as fibers in the mat, if thermoplastic they melt in the molding of a finished product. The thermoset cures under heat and pressure binding the base fibers into a molded form which is permanently self-supporting, that is, stiff enough to retain its shape. It should be understood that the product may be used alone or as a layer in a laminated structure in which one or more additional layers of the same or different material are laminated thereto.

We claim:

1. A soft, flexible, handleable fibrous mat from which a permanently shaped product can be molded by the application of predetermined heat and pressure in a compression molding operation, said mat consisting essentially of cellulose base fibers, and means for linking and bonding and for resisting separation of said base fibers and adding tensile strength to said mat including carrier fibers intertwined with said based fibers and bonded to said base fibers and to each other forming connections therebetween, said mat having, in addition to said base fibers and means for linking and bonding, a dormant, uncured thermosetting ingredient, said thermosetting ingredient having a curing temperature not greater than the temperature of said compression molding operation so that said thermosetting ingredient will cure when said mat is subjected to said heat and pressure in said compression molding operation.

2. A soft, flexible, handleable fibrous mat from which a permanently rigid, shaped product can be molded by the application of heat and pressure in a compression molding operation, said mat being made of a mixture with percentages by weight consisting of 85% wood fibers, 5% blended non-thermoplastic textile fibers of 35% cotton and 65% polyester, 5% low melt point thermoplastic polyester resin which softens and becomes tacky at about 225° F., and 5% phenolic resin which cures at about 325° F. or higher, said thermoplastic resin bonding said fibers to each other forming connections therebetween, said phenolic resin being uncured but adapted to cure when said mat is subjected to heat and pressure in said compression molding operation, said bonding of said fibers to each other by said thermoplastic resin being caused by heating said thermoplastic resin to its tack point but below the curing temperature of said phenolic resin to avoid any curing of said phenolic resin.

3. A fibrous mat as defined in claim 1, wherein said base fibers are wood.

4. A fibrous mat as defined in claim 1, wherein said carrier fibers include thermoplastic fibers, and wherein said bonding is caused by heating the said thermoplastic carrier fibers to their tack point but not to melting, thus maintaining their essentially fibrous form, said tack point being below the curing temperature of the thermosetting ingredient involved thereby avoiding curing of the thermosetting ingredient.

5. A fibrous mat as defined in claim 4, wherein said thermoplastic carrier fibers are made of material selected from the group consisting of the vinyl family, the polyester family, the polyolefin family, the polyamide family and any physical or chemical combination of the above families.

6. A fibrous mat as defined in claim 1, wherein some of the carrier fibers are thermoplastic fibers and some are textile fibers, and wherein said bonding is caused by heating the said thermoplastic carrier fibers to their tack point but not to melting, thus maintaining their essentially fibrous form, said tack point being below the curing temperature of the thermosetting ingredient involved thereby avoiding curing of the thermosetting ingredient.

7. A fibrous mat as defined in claim 6, wherein said thermoplastic carrier fibers are made of material selected from the group consisting of the vinyl family, the polyester family, the polyolefin family, the polyamide family and any physical or chemical combination of the above families.

8. A fibrous mat as defined in claim 6, wherein said linking and bonding means also includes a thermoplastic resin that effects bonding of said fibers when heated to its tack point which is below the curing temperature of the thermosetting ingredient.

9. A fibrous mat as defined in claim 1, wherein said bonding means includes a chemical bonding agent which effects the aforesaid bonding of said base and carrier fibers.

10. A fibrous mat as defined in claim 1, having indentations in one or both of its surfaces to increase the flexibility thereof.

11. A product made from the fibrous mat defined in claim 1, 2, 3, 4, 5, 6, 7, 8, 9 or 10 by subjecting said mat to sufficient heat and pressure in a compression molding operation to cure said thermosetting ingredient and to compress the material to the desired thickness and density.

12. A product as defined in claim 11, having areas of significantly differing density, designed to provide both structure and cushioning.

13. A laminated structure wherein the product as defined in claim 11 constitutes a first layer of said structure and one or more additional layers of the same or different material are laminated to said first layer.

* * * * *